UNITED STATES PATENT OFFICE.

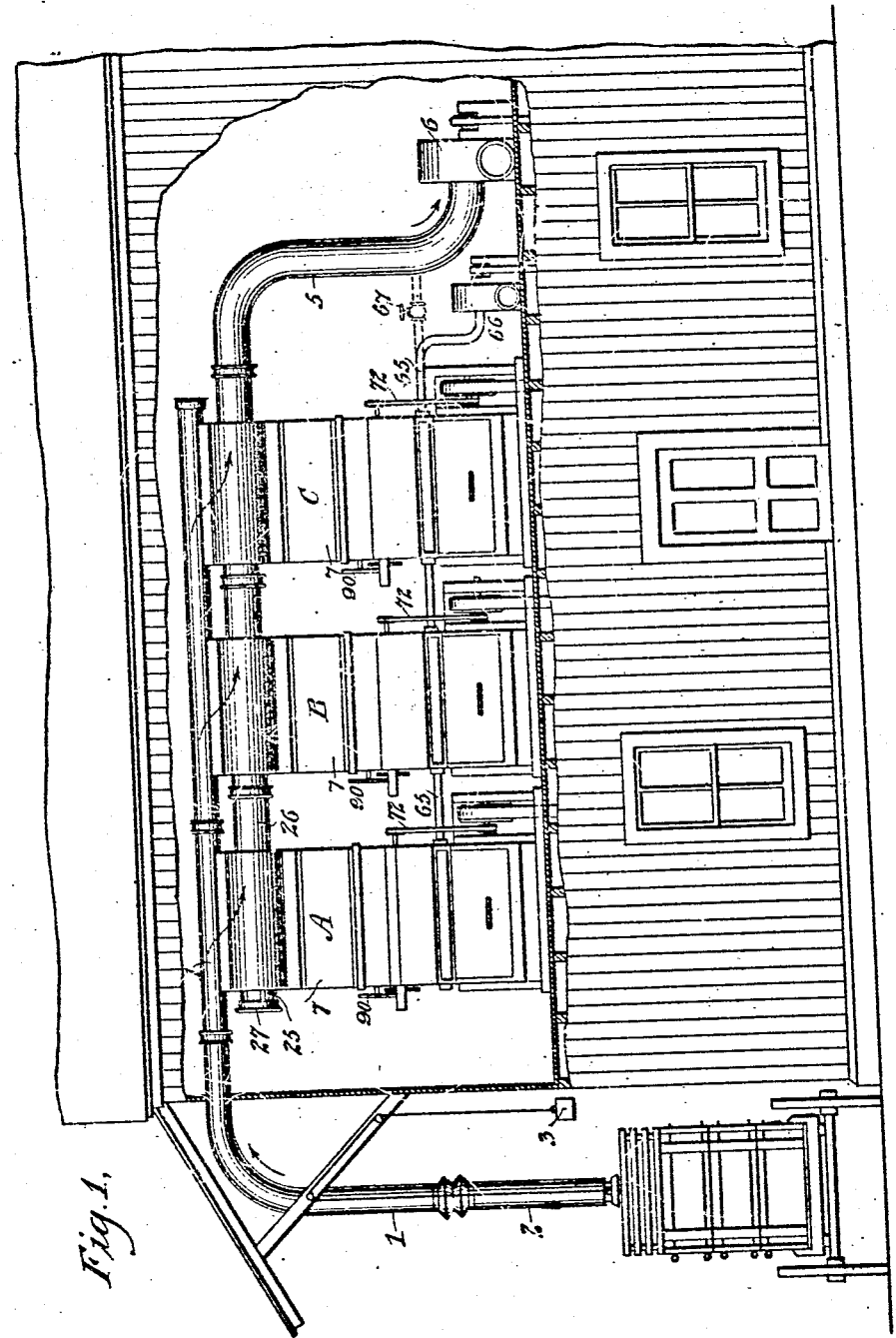

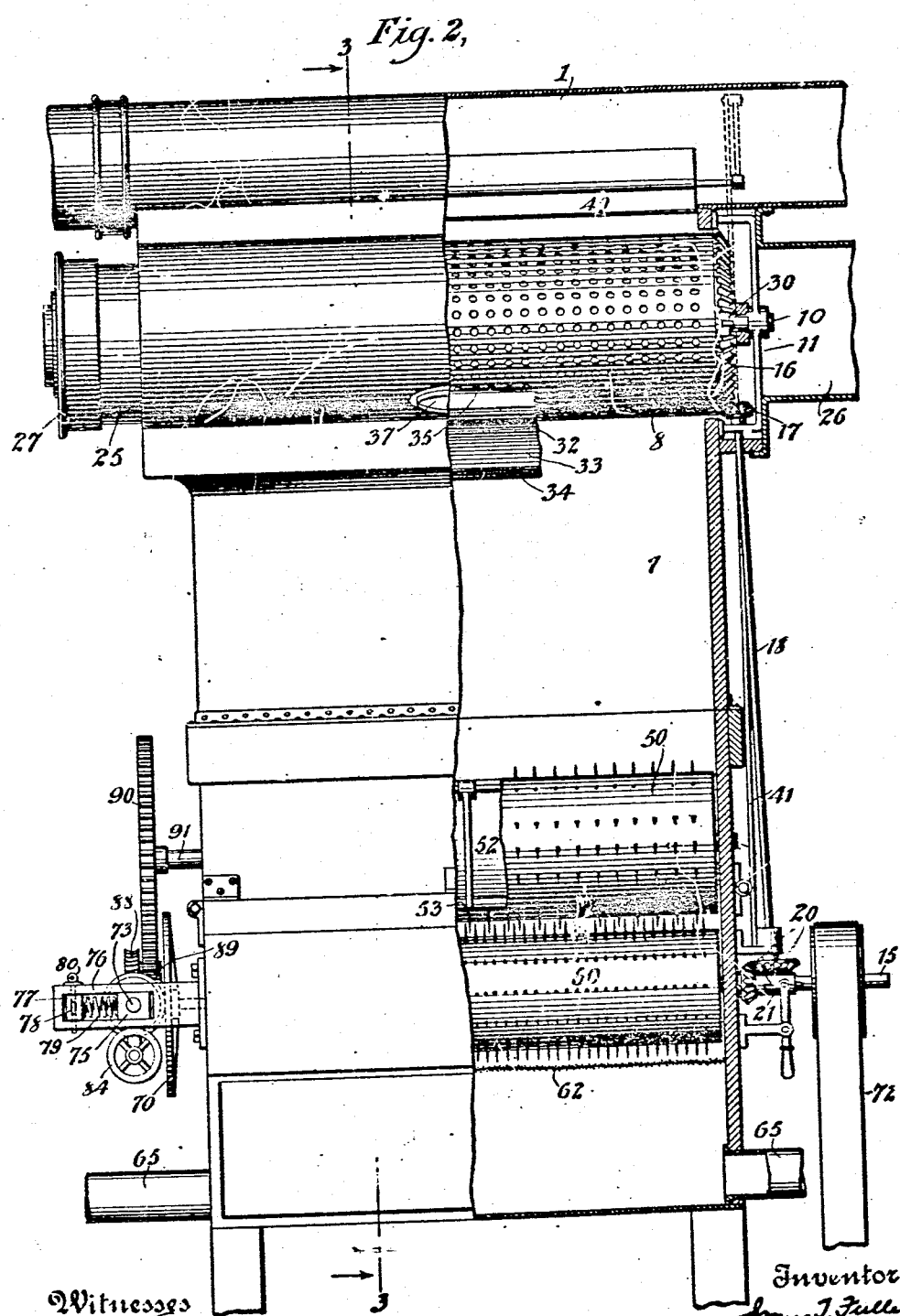

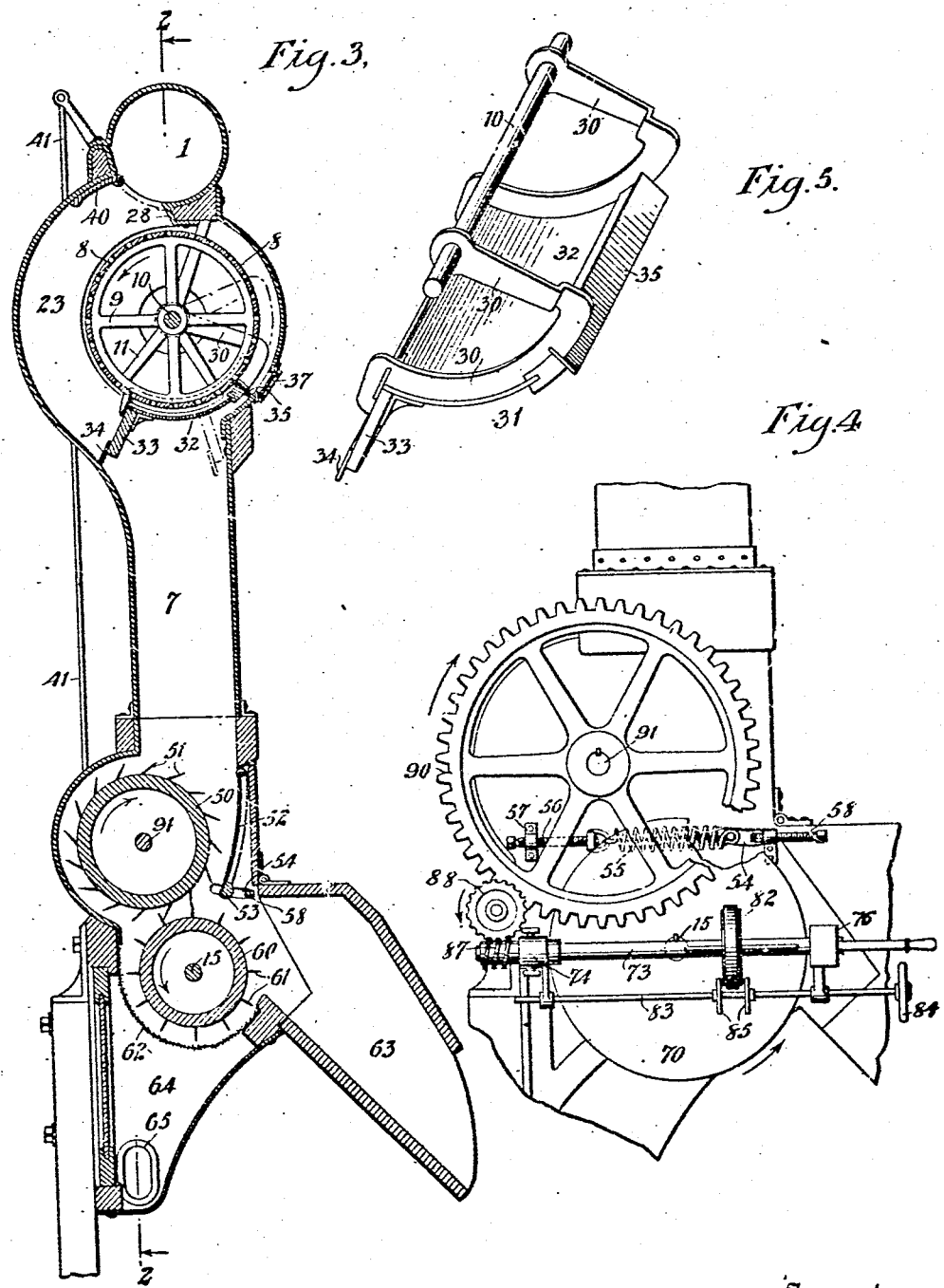

JAMES T. FULLER, OF CALVERT, TEXAS, ASSIGNOR TO FULLER COTTON GIN COMPANY, A CORPORATION OF DELAWARE.

APPARATUS FOR HANDLING SEED-COTTON.

No. 897,079.     Specification of Letters Patent.     Patented Aug. 25, 1908.

Application filed July 5, 1902. Serial No. 114,408.

*To all whom it may concern:*

Be it known that I, JAMES T. FULLER, a citizen of the United States, and a resident of Calvert, Robertson county, Texas, have invented certain new and useful Improvements in Apparatus for Handling Seed-Cotton, of which the following is a full, clear, and exact description, reference being had to the accompanying drawings, forming part of this specification.

My invention relates to apparatus for elevating seed cotton and also to apparatus for feeding the cotton to the gins, and the object thereof is the provision of means by which these results are accomplished.

The improved apparatus which I have devised for elevating the cotton is operated pneumatically and is arranged to deliver the cotton to the gin feeding devices, which comprise mechanism for separating and cleaning the cotton and feeding it to the gins in proper condition for the ginning operation.

In the accompanying drawings, Figure 1 is a sectional view of a gin-house showing the cotton elevator connected with a battery of three gin feeders in elevation; Fig. 2 is an elevation, (partly in section on the line 2—2 Fig. 3), showing a section of the elevator conduits and feeding devices; Fig. 3 is a vertical section on the line 3—3, (Fig. 2); Fig. 4 is a detail view showing the mechanism for varying the relative speed of the feeding and delivery drums on an enlarged scale; Fig. 5 is a detail view showing more clearly the construction of the valve which controls communication between the supply pipe and the feeding and cleaning devices.

Similar reference characters are employed to designate corresponding parts in all the views.

The preferred form of apparatus embodying my invention which I have selected for illustration and description comprises the cotton supply pipe 1, provided with a telescoping end 2, connected with a counterweight 3, by means of which the cotton is taken direct from the wagons in which it is brought to the gin-house and carried to the feeders. The opposite end of the supply pipe 1 is closed by a suitable cap. It extends over the tops of the feeders A, B and C, and is in communication, by the exhaust pipe 5, with the exhaust fan 6, as will be presently described.

It will be understood that any convenient number of feeders may be connected with this pneumatic elevating system. In Fig. 1 I have illustrated a battery consisting of three feeders, but as the construction and connections of all the feeders A, B and C are similar, I will limit my description thereof to the feeder A. The feeder comprises a gravity feeding trunk 7, terminating at its upper end in an enlargement which forms an inclosing chamber for a screen 8, of perforated sheet metal or wire gauze, carried by spiders 9, mounted on the shaft 10, journaled in supporting bearings 11, secured to the frame of the apparatus. The screen 8, in that particular embodiment of my apparatus illustrated in the drawings, is arranged to be continuously rotated, (in the direction indicated by the arrow Fig. 3), during the feeding operation, and this rotation is effected by connecting the screen with the shaft 15, by means of the bevel gears 16 and 17, shaft 18, and gears 20. A clutch 21 is provided to throw the gears 20, into and out of operative engagement. The screen 8, is mounted in the chamber at the upper end of the trunk 7, so as to provide a connecting passage 23, which partially surrounds the screen and communicates at its upper end with the cotton supply pipe 1, and at its lower end with the feeding trunk 7.

The ends of the chamber, in which the screen 8, is mounted, are formed with circular openings into which the ends of the screen project slightly, as shown in Fig. 2, and over the openings are secured pipes or thimbles 25 and 26. On one side of the feeder A, the thimble 25 is closed air tight by a suitable cover 27, while the pipe or thimble 26, on the other side of the feeder, is connected with the thimble on the next feeder in the battery, the last feeder C, being connected with the air exhaust pipe 5, as shown. The space between the cotton supply pipe and the top of the screen 8, (Fig. 3), is effectively closed against the passage of air by the inclined flange 28.

Arms 30, are loosely mounted on the shaft 10, outside the ends of the screen, and secured to them is a swinging valve 31, which comprises the sector-shaped portion 32, extending along the surface of the screen 8, and the radially projecting portion 33, which, when the feeder is not in action, will close the passage 23, below the screen. The valve 31, is provided with suitable air retaining strips 34 and 35, of rubber or other suitable material, and is preferably so shaped or weighted that when the feeder is not in action or when the feeder trunk 7, or the upper part thereof, is free from cotton, the valve will automatically assume the position shown in dotted lines in Fig. 3, thus effectively cutting off the trunk 7, from communication with the pneumatic system. A glazed sight opening 37, permits the position of the valve 31, to be determined from the outside. A valve 40, and suitable operating means 41, are provided for completely cutting off the feeder and screen from the others in the battery.

The trunk 7 at its lower end is connected with a suitable inclosing chamber in which are located the feeding, separating and cleaning devices. These comprise a feeding drum 50, provided with arms or spikes 51, and mounted to rotate on shaft 91, in suitable bearings. Pivotally supported in front of the drum 50 is the compressing plate 52, to the lower side of which is secured a bar 53, the ends of which project through slots 54, in the side frames of the apparatus. The function of the plate 52 is to present and hold the compressed cotton to the action of the spikes 51.

The ends of the bar 53, outside the frame are connected on each side of the machine with a tension spring 55, (Fig. 4). The tension of each spring is adjustable by means of a bolt 56, to which the spring is secured and which is threaded in a lug 57, on each side of the machine. An adjustable stop 58, arranged in the path of movement of each end of the bar 53, limits the outward movement of the plate 52.

A delivery drum 60, provided with projecting arms 61, is journaled in the frame of the machine below the feeding drum 50. The drums 50 and 60, are arranged to revolve in the direction shown by the arrows, (Fig. 3), and below the drum 60, is a screen 62, over which the cotton is carried on its way to the chute 63, which communicates directly with the gin. The refuse passing through the screen 62, collects in the chamber 64, and is carried off through the refuse exhaust pipe 65, or by means of any suitable conveyer. The pipe 65 is suitably connected with the fan 6. It will only be necessary to operate the refuse-exhaust occasionally, and provision will therefore be made for opening and closing communication between the pipes 65 and the blower 6 by means of a suitable valve 67 or, if a separate fan be employed, for starting and stopping it when required.

It is desirable, and for the best results necessary, that the drums 50 and 60 should revolve at different speeds and that provision should be made for varying their relative speed, and in Fig. 4 I have shown on an enlarged scale novel mechanism for effecting the result. The drum 50 is arranged to revolve very slowly while the rotational speed of the drum 60 is much higher and the mechanism which I have devised for accomplishing the result above mentioned, comprises a disk 70, secured to the shaft 15 of the drum 60, at one side of the machine. The drum 60, is driven by a belt 72, (Fig. 2), which connects it with the driving shaft of the gin. A shaft 73, journaled in suitable bearings 74, and 75, is arranged to extend diametrically over the surface of the disk 70. The bearing 74 is sufficiently loose to permit a slight swinging movement of the shaft 73 and the bearing 75, consists of a sliding block mounted in the guide 76. A block 77, provided with a handle 78, is also carried by the guide 76, and between it and the journal block 75, is arranged a spring 79. The block 77, may be moved in and out in the guide 76, and is held in different positions therein by the pin 80, which passes through it and through holes in guide 76. A friction wheel 82, is splined to the shaft 73, and when the block 77, is moved inwardly and locked in position, the wheel 82, will be held firmly but yieldingly against the disk 70, by the pressure of the spring 79. By removing the pin 80, and moving the block 77, towards the end of the guide 76, as shown in Fig. 2, the pressure on the wheel 82 will not be sufficient to hold it in operative engagement with the disk 70. Below the shaft 73 a rod 83 is mounted in suitable bearings and is provided with a hand wheel 84. Flanges 85 are mounted rigidly on the rod 83 so as to inclose the sides of the wheel 82. One end of the rod 83 is threaded and one of its bearings 86 is correspondingly threaded, so that as the rod 83, is turned, the wheel 82, will be carried toward or away from the center of the disk 70, depending on the direction in which the rod is turned. A worm 87, is secured to the end of the shaft 73, and is arranged to mesh with the pinion 88, to which is secured the pinion 89, (Fig. 2), which meshes with the gear 90, carried by the shaft 91, of the feeding drum 50. Thus the movement of the drum 60, will be imparted to the drum 50, but the speed will be very much reduced and may, within the necessary limits, be varied by turning the hand-wheel 84, to change the position of the wheel 82, with respect to the center of the disk 70, the speed being increased by moving the wheel 82 away from the shaft 71, and decreased by moving it nearer. Each feeder is carried by the supports 93, secured to the floor of the gin-house, thus entirely relieving the gin from the weight of the apparatus.

The operation of the apparatus which I have described needs but little further description. The end 2 of the supply pipe having been placed and adjusted over the cotton to be ginned, the exhaust fan 6 being in operation, draws the cotton up into the supply pipe, whence it passes into the connecting passage 23. The gin having meantime been started, the screen 8, is rotated, constantly bringing a fresh screening surface to the top, so that the draft will be largely concentrated at that point, the effect thereof diminishing to such an extent on the cotton carried to the lower surface of the screen that it will fall into the passage 23, against that portion 33, of the valve 31, which closes the entrance to the trunk 7. As the cotton accumulates in the passage 23, the weight and feeding action thereof, produced by the draft and revolving screen, will overcome the weight of the valve and it will be carried into the position shown in full lines, (Fig. 3), and the cotton will then fall into the trunk 7 and be carried by the spikes on the drum 50, down between it and the plate 52 when it will be engaged by the delivery drum, by which it will be carried over the screen 62, and delivered into the gin through the chute 63. When the supply of cotton is exhausted and the passage 23, and upper portion of the trunk 7, are emptied, the valve 31, will close automatically, shutting off the trunk 7 from the screen and preventing the entrance of air through the trunk. Thus the operation of the elevator will not be interfered with, and the necessity of waiting, before commencing on another customer's cotton, until all the cotton in the feeder is ginned out is avoided, as a new lot may be started on as soon as the valve 31 closes, which is readily observable through the sight opening 37. The screen in rotating continuously presents a fresh or uncovered surface to the entering cotton and the clogging of the screen and consequent stoppage of the exhaust is absolutely prevented. I am thus enabled to employ a continuous, as distinguished from an intermittent, exhaust system and can use a smaller fan without providing any mechanical devices for keeping the feeder trunk closed during the feeding operation. The continuous presentation of the fresh surface of the screen also results in a continuous screening action facilitating the removal of the free dust in the cotton and preventing the clogging of the screen by loose fibers which frequently occurs in elevating apparatus in which a stationary screen is employed. The plate 52 holds the cotton in a compressed condition to the action of the spikes on the feeding cylinder until it is carried past the plate 52 by the spikes on the feeding drum, which draw the fibers out and thus any lumps are prevented from entering and clogging the gin.

Having thus described my invention, what I claim as new and desire to secure by Letters Patent is:

1. In a cotton feeding apparatus, the combination with a cotton supply pipe, a screen, an air exhaust pipe connected with the supply pipe through the screen and a valve operating by gravity to close the feeding trunk without interrupting the air exhaust through the screen, substantially as set forth.

2. In a gin feeding apparatus, the combination of a gravity feeding trunk, a cotton supply pipe, a connecting passage between the trunk and the supply pipe, a movable screen between the trunk and the supply pipe, a pneumatic exhaust pipe connected with the supply pipe through the screen, a segmental swinging valve between the connecting passage and the trunk arranged to be opened by the movement of the cotton in the connecting passage and to close by gravity when the movement of the cotton in said passage is arrested or the supply thereof discontinued, substantially as set forth.

3. In a gin feeding apparatus, the combination of a gravity feeding trunk, a cotton supply pipe, a connecting passage between the trunk and the supply pipe, a rotating screen between the trunk and the supply pipe, pneumatic exhaust pipe connected with the supply pipe through the screen, a swinging segmental valve between the connecting passage and the trunk arranged to be opened by the movement of the cotton in the connecting passage and to close by gravity when the movement of the cotton in said passage is arrested or the supply thereof discontinued, substantially as set forth.

4. In apparatus for feeding cotton, mechanism for effecting a variation in the relative speed of the feeding and delivery drums, comprising a rotating disk mounted on the shaft of the delivery drum, a wheel which engages with the surface of said disk, a shaft upon which said wheel is slidably mounted, means for adjusting and holding said wheel in different positions relatively to the center of said disk and gears connecting said shaft with the feeding drum, substantially as set forth.

JAMES T. FULLER.

Witnesses:
S. G. METCALF,
LAUCHLIN McLEAN.